United States Patent
Robbins

[15] 3,662,316
[45] May 9, 1972

[54] SHORT BASE-BAND PULSE RECEIVER

[72] Inventor: Kenneth W. Robbins, Wilmington, Mass.

[73] Assignee: Sperry Rand Corporation, New York, N.Y.

[22] Filed: Mar. 12, 1971

[21] Appl. No.: 123,720

[52] U.S. Cl. ..........................340/167 R, 325/43, 325/325, 328/171, 329/102, 329/126, 329/205
[51] Int. Cl. .................H03b 3/02, H03d 1/18, H04b 7/00
[58] Field of Search ............340/167; 325/27, 43, 325, 374, 325/375; 328/111, 171; 329/102, 103, 104, 110, 126, 162, 205

[56] References Cited

UNITED STATES PATENTS

| | | |
|---|---|---|
| 3,098,973 | 7/1963 | Wickersham, Jr. et al. .......325/375 X |
| 3,212,016 | 10/1965 | Day et al. ..........................329/162 X |
| 3,390,334 | 6/1968 | Forward............................325/325 X |
| 3,465,253 | 9/1969 | Rittenbach........................325/325 X |
| 3,562,655 | 2/1971 | Peterson...............................329/126 |
| 3,569,845 | 3/1971 | Steinberg...........................329/103 X |

*Primary Examiner*—Donald J. Yusko
*Attorney*—S. C. Yeaton

[57] ABSTRACT

A pulse receiver for detecting short base-band electromagnetic pulses employs a dispersionless, broad band transmission line antenna with a circuit cooperating with a biased semiconductor diode located within the transmission line for instantaneously detecting substantially the total energy of the baseband pulse and providing a corresponding output suitable for application in conventional utilization circuits.

12 Claims, 8 Drawing Figures

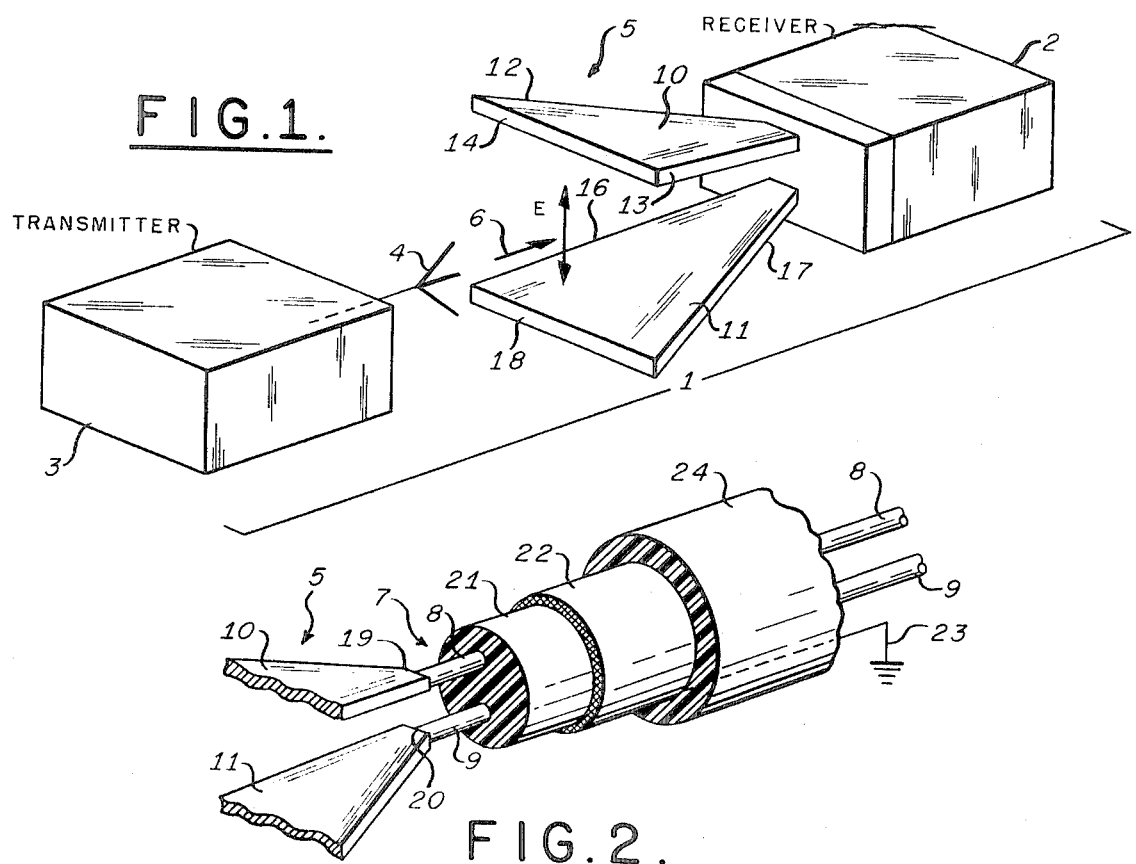
FIG.1.
FIG.2.
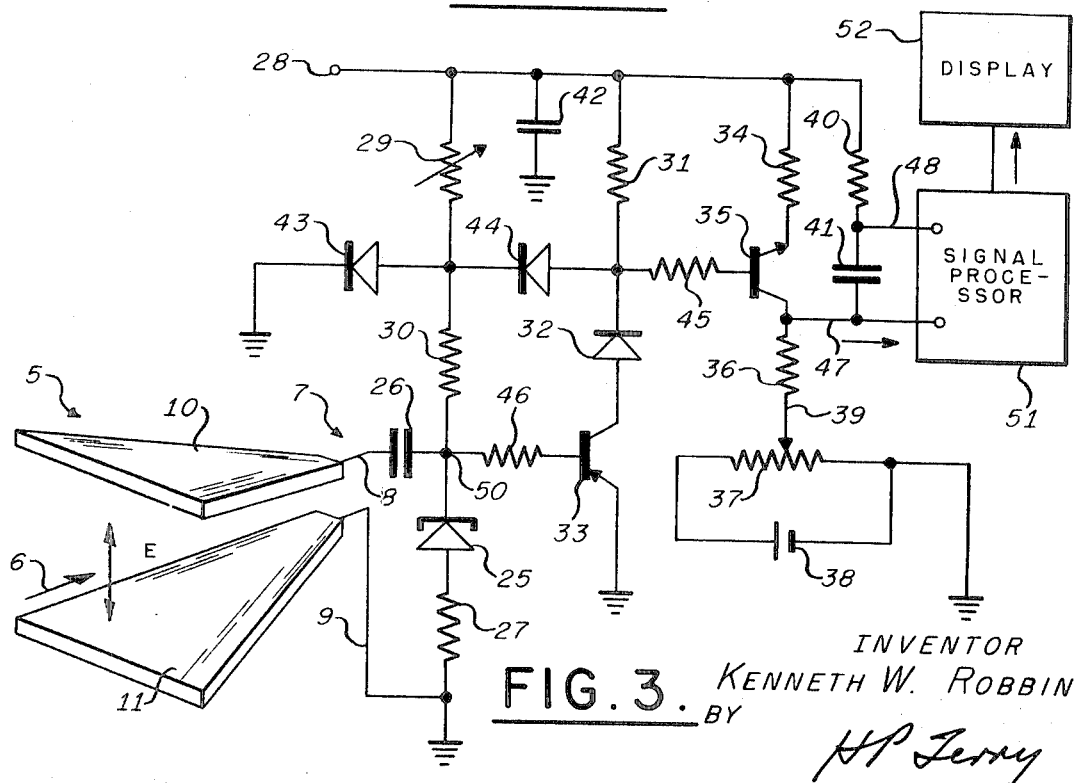
FIG.3.
INVENTOR
KENNETH W. ROBBINS
BY
H.P. Ferry
ATTORNEY

INVENTOR
KENNETH W. ROBBINS
BY
ATTORNEY

SHORT BASE-BAND PULSE RECEIVER

BACKGROUND OF THE INVENTION

1. Field of the Invention

The invention pertains to the reception, detection, and use of very short, base-band electromagnetic pulses and more particularly relates to means for the reception of such base-band pulses of sub-nanosecond duration.

2. Description of the Prior Art

While devices exist in the prior art which are capable of receiving and detecting relatively short duration electromagnetic pulses of considerable amplitude, they do so only because the spectral content of such pulses is extremely wide, generally extending from direct current to infinity. A further requisite of the prior art receiver is that at least one or more adjacent lines of the spectrum of the pulse fall within the relatively narrow band of the prior art receiver and also have sufficient amplitude compared to the self-noise of the receiver to cause a distinguishable detection response at the receiver output.

In this context, all known receivers are properly referred to as narrow band devices; they are open to relatively dispersionless reception of only a few pulse signal spectral components between zero and infinity frequency. For example, even amplifiers of the distributed parameter type, such as the helix traveling wave amplifier, are in reality relatively narrow band devices which pass only a small range of frequencies in the total spectrum of a base-band pulse, and cause considerable undesired dispersion of the received signal, especially near the boundaries of the amplifier pass band. Such action is an inherent property of the slow wave propagation circuits used, being even further constrained by the narrow band signal input and output structures conventionally associated with such slow wave propagation circuits. As the level of the short base-band pulse is diminished, it is no longer detectable when its spectral components fall below the self-noise of prior art receivers.

SUMMARY OF THE INVENTION

The present invention relates to a sub-nanosecond electromagnetic energy pulse receiver for receiving and detecting a very short base-band electromagnetic pulse or pulses, and for supplying an output useful for operating conventional utilization equipment. The receiver system employs a substantially dispersionless, very wide band transmission line antenna system cooperating directly with a biased diode located within the transmission line for detecting the total energy of the base-band pulse. A cooperating circuit coupled to the diode supplies a corresponding output signal suitable for application in conventional utilization circuits and recycles the receiver system to make it ready for the receipt of a succeeding short base-band pulse. Since the total energy of the base-band pulse is instantaneously supplied by the dispersionless antenna system across the semiconductor diode, the receiver may operate with pulse signals having spectral components the amplitudes of which are all incapable of detection by conventional relatively narrow band receivers.

BRIEF DESCRIPTION OF THE DRAWINGS

FIG. 1 is a perspective view of a communication system for employment of the novel receiver of the present invention.

FIG. 2 is a perspective view, partly in cross section, of part of the receiver of FIG. 1.

FIG. 3 is a circuit diagram showing circuit components of the novel receiver and their interconnections.

DESCRIPTION OF THE PREFERRED EMBODIMENTS

Figure 4A:
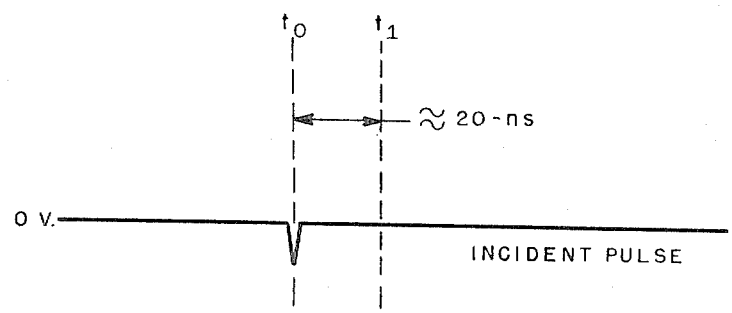
FIGS. 4a, 4b, 4c, 4d, and 4e are graphs of wave forms useful in explaining the operation of the invention.
Figure 4B:
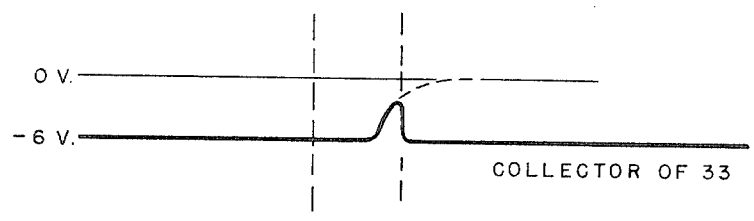

FIG. 1 illustrates a short base-band pulse communication system 1 for employment of the novel receiver 2 of the present invention which may operate in cooperation with an impulse or short base-band transmitter 3 that may be of generally conventional type. For example, there is known in the art a variety of transmitter systems for producing single positive or negative going pulses or regular or other trains of pulses each having very short duration and for radiating them from a suitable antenna 4. Rotary and other spark gap transmitters, for instance, though somewhat inefficient, readily produce short electromagnetic pulses. Delay line pulse generators are well understood in the art to be capable of adjustment such that very short electromagnetic pulses may be radiated. One device for producing short base-line pulses is disclosed by G.F.Ross in the U.S. Pat. No. 3,402,370 for a "Pulse Generator," issued Nov. 30, 1965, and assigned to the Sperry Rand Corporation.

Where all prior art transmitters are not normally used to produce truly short base-line or sub-nanosecond impulses, mere adjustment of parametric relations may permit such a result substantially to be obtained. Further, the performance of such transmitters in launching actual base-band pulses into space may be improved by use of the kind of radiating antenna system employed by G.F.Ross and D. Lamensdorf in the U.S. Pat. application Ser. No. 46,079, for a "Balanced Radiation System," filed June 15, 1970 and assigned to the Sperry Rand Corporation. The Ross and Lamensdorf device, for instance, employs an electrically smooth, constant impedance, transmission line system for propagating TEM mode electromagnetic waves. The transmission line system is employed for the cooperative cyclic storage of energy on the transmission line and for its cyclic release by propagation along the transmission line for radiation at the end of a section of the transmission line formed as a flared or tapered directive antenna. Thus, cooperative use is made of the transmission line system for signal generation by charging the transmission line at a first rate of charging and also for signal radiation into space by discharge of the line in a time much shorter than required for charging. Discharge of the transmission line causes a voltage wave to travel toward the open end or radiating aperture of the antenna structure. The process operates to produce, by differentiation, a sharp impulse of sub-nanosecond duration that is radiated into space. The antenna system has a wide instantaneous band width, so that it may radiate very sharp impulse-like signals with low distortion. Further, the antenna has an energy focusing characteristic such that energy radiated in a predetermined direction is maximized.

By way of further example, the antenna 5 used with the present receiver 2 may be modified for use as a radiating element 4 in such a transmitter. It will be further recognized that the receiver-antenna system of the present invention may be used to detect sub-nanosecond base-band radiations such as produced by positive or negative going electrostatic or other electrical discharges, including those caused by lightning, no man-made transmitter being required for operation of the novel receiver.

As is seen in FIGS. 1, 2, and 3, the receiver antenna 5 comprises a structure having mirror image symmetry about a median plane at right angles to the direction of the vector of the electric field E propagating into the antenna in the direction indicated by arrow 6. The same is true of the cooperating transmission line 7, seen in FIG. 2, which comprises parallel wire transmission line conductors 8 and 9; conductors 8 and 9 are spaced parallel wire conductors constructed of a material capable of conducting high frequency currents with substantially no ohmic loss. Further, conductors 8 nd 9 are so constructed and arranged as to support TEM mode propagation of high frequency energy, with the major portion of the electric field lying between conductors 8 and 9.

The TEM receiver antenna 5 further consists of a pair of flared, flat, electrically conducting planar members 10 and 11. Members 10 and 11 are, for example, generally triangular in shape, member 10 being bounded by flared edges 12 and 13 and a frontal aperture edge 14. Similarly, member 11 is bounded by flaring edges 16 and 17 and a frontal aperture edge 18. Frontal aperture edges 14 and 18 may be straight or arcuate. Each of triangular members 10 and 11 is slightly truncated at its apex, and the truncations 19 and 20, seen in FIG. 2, being so constructed and arranged that conductor 8 is smoothly joined without overlap at 19 to antenna member 10. Likewise, conductor 9 is smoothly joined without overlap at truncation 20 to antenna member 11. It is to be understood that the respective junctions at truncations 19 and 20 are formed using conventionally available techniques for minimizing any impedance discontinuity corresponding to the junctions.

It is also to be understood that the flared members 10 and 11 of antenna 5 are constructed of material highly conductive for high frequency currents. It is further apparent that the interior volume of antenna 5 may be filled with an air-foamed dielectric material exhibiting low loss in the presence of high frequency fields, such material acting to support conductor 10 in fixed relation to conductor 11. Alternatively, the conductive elements of antenna 5 may be fixed in spaced relation by dielectric spacers which cooperate in forming enclosing walls for the configuration, protecting the interior conducting surfaces of antenna 5 from the effects of precipitation and corrosion.

As noted, the planar collector elements 10 and 11 of receiver antenna 5 are coupled in impedance matched relation to the two wire transmission line 7, seen in more detail in FIG. 2. Transmission line 7 is arranged to have the same impedance and dispersionless characteristics as the transmission line comprising antenna elements 10 and 11. Transmission line 7 may have its parallel wire conductors 8 and 9 molded into a low-loss dielectric element 21 for the purpose of accurately determining the separation of conductors 8 and 9, and so that line 7 has a constant impedance along its length. Dielectric element 21 may be surrounded by a braided or other conductive shield 22 which may be grounded at a convenient location, as by lead 23. Shield 22 may be, in turn, surrounded by a protective plastic cover element 24 of the well known type. The balanced two wire line 7 is thus readily attached to the active input element 25 of receiver 2, as will be discussed in connection with FIG. 3. Generally, the length of line 7 between antenna 5 and active element 25 will be short.

A cooperating antenna 5 and transmission line 7 of the form shown in FIGS. 1, 2, and 3 is preferred in part, because TEM mode propagation therein is readily established. The TEM propagation mode is preferred, since it is the substantially non-dispersive propagation mode and its use therefore minimizes distortion of the propagating sub-nanosecond signal to be received. The simple, balanced transmission line structure also permits construction of the antenna-transmission line configuration with minimum impedance discontinuities. Furthermore, it is a property of the symmetric type of transmission line forming antenna 5 that its characteristic impedance is a function of $b/h$, where $b$ is the width dimension of the major surfaces of conductors 10 and 11 and $h$ is the distance between the inner faces of the conductors 10 and 11. For example, the ratio $b/h$ is kept constant in the instance of the antenna 5 transmission line 10, 11 because the ratio of $b$ and $h$ is constant.

According to the invention, the receiver-antenna 5 is made compatible with transmission line 7 by holding the value of the ratio $b/h$ constant within antenna 5. In other words, if the ratio $b/h$ is kept constant along the direction of propagation in antenna 5, the characteristic impedance of antenna 5 will be constant along its length and may thus readily be made equal to that of line 7. By maintaining a continuously constant characteristic impedance and TEM propagation along the structure including antenna 5 and line 7, frequency sensitive reflections are prevented therein and frequency dispersion is eliminated. The received sub-nanosecond impulse therefore flows through antenna 5 and line 7 without substantial reflection and without substantial degradation of its shape or amplitude. Since the full energy or amplitude of a low-level sub-nanosecond base-band pulse is thus delivered by the antenna-transmission line system, it is seen that the active receiver can be sensitive to extremely short low-level base-band pulses having an extremely wide spectral content which would be incapable of detection using conventional, wide-pulse reception techniques. In addition, it will be clear to those skilled in the art that types of non-dispersive antennas having different receptivity patterns may be substituted for the illustrated antenna. For example, the omniazimuthal antenna disclosed in the G.F.Ross U.S. Pat. application Ser. No. 832,337 for a "-Time Limited Impulse Response Antenna," filed June 11, 1969, and assigned to the Sperry Rand Corporation, may be employed.

Any sub-nanosecond pulse collected by antenna 5 is passed with substantially no degradation within two wire transmission line 7 to the active element 25, which is preferably a tunnel diode or other high speed diode adapted to serve as an impulse detector. A suitable diode 25 has a negative resistance current-voltage characteristic such that, under proper bias, the diode response to the arrival of impulse emissions from the transmitter-antenna configuration 5 is to move abruptly into its region of instability, causing it to become highly conductive. While other such diodes may be used, a suitable diode is the germanium 1N3717 tunnel diode.

Diode 25 is coupled to conductor 8 through a small capacitor 26 and through resistor 27 to ground and also to conductor 9 of transmission line 7. Resistor 27 serves a potential level setting function enabling tunnel diode 25 to drive silicon transistor 33, and aids in providing a proper impedance match to line 7 so that reflections are avoided. Capacitor 26 acts as a coupling capacitor, preventing damage to the receiver if the input is accidentally shorted. An appropriate bias source (not shown) for diode 25 is connected to terminal 28 for providing current flow through adjustable resistor 29 and level setting resistor 30 to diode 25.

A second series circuit connected to bias terminal 28 comprises resistor 31, diode 32, which may be a conventional 1N914 diode, and transistor 33, which may be a conventional 2N3638 transistor. A third series circuit connected to bias terminal 28 comprises resistor 34, avalanche transistor 35, which may be a selected conventional 2N706 transistor, and resistor 36. Resistor 36 is connected to a tap 39 of a voltage source comprising potentiometer 37 and battery 38. A fourth series circuit connected to bias terminal 28 comprises resistor 40 and capacitor 41. Capacitor 42, also connected to terminal 28, forms an alternating current ground connection.

Diode 43 is coupled between ground and the junction between resistors 29 and 30. The same junction is connected through diode 44 to the junction between resistor 31 and diode 32. Diodes 43 and 44, like diode 32, may be conventional 1N914 diodes. The junction common to resistor 31 and diode 32 is connected to the base of transistor 35 through resistor 45. The junction 50 between capacitor 26 and tunnel diode 25 is connected through resistor 46 to the base of transistor 33. The junction between the collector of transistor 35 and resistor 36 is coupled to one side of capacitor 41 by lead 47, which also serves as an ungrounded output lead for the circuit. A second ungrounded output lead 48 is coupled at the junction between resistor 40 and capacitor 41.

While other combinations of parameters may be used in practicing the invention, representative values of such circuit values include the following:

Resistor
27—82 ohms
29—1.0 K ohms
30—390 ohms
31—2.2 K ohms
34—22 ohms
36—270 ohms
40—56 ohms
45—330 ohms
46—390 ohms
Capacitor
26—1 picofarad, 100 picofarads
41—680 picofarads
42—1.0 picofarads For the above values, the power source represented by battery 38 and potentiometer 37 may be adjusted to supply about +150 volts at tap 39. Also, a −6 volt bias source may be coupled to bias terminal 28.

In operation, tunnel diode 25 is biased very near to its break down point by manual adjustment of resistor 29. For example, in the instance of a representative 1N3713 germanium tunnel diode, somewhat less than 10 milliamperes is required to bias the diode near its break down point. In this situation, the voltage levels seen by transistor 33 are not sufficient to cause it to conduct and it remains quiescent. Diodes 32, 43, and 44 also remain nonconductive. The avalanche transistor 35 therefore does not have any forward bias. Its collector potential, by virtue of the setting of the tap 39 potentiometer 37, is such that it cannot break into spurious saw tooth oscillations. Avalanche transistor 35 is therefore also in its quiescent state and the receiver is ready for the receipt of an input short base-band pulse.

Such a short base-band pulse, preserved in shape and amplitude by antenna 5 and transmission line 7, may be, for example, 0.5 nanoseconds in duration and may produce an instant voltage change across tunnel diode 25, for example, of −0.1 volts peak. Such a signal is illustrated in FIG. 4a, but exaggerated in duration for clarity. Tunnel diode 25 instantly switches from its quiescent low voltage, positive resistance state through its unstable negative resistance state to its high voltage positive resistance state. Upon this event, voltage and current relations in the remainder of the circuit are transiently disturbed.

Figure 4C:
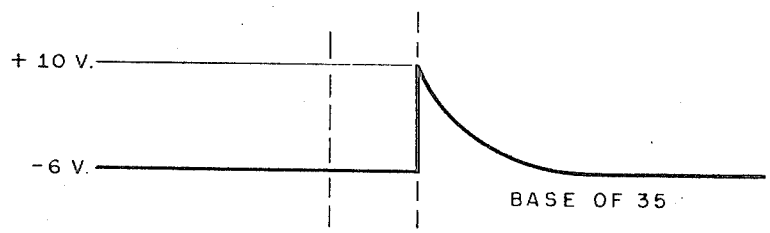

Transistor 33 becomes forward biased by virtue of the presence of resistor 46 and the circuit including diode 32, resistor 31, and transistor 33 conducts current after a time delay inherent in transistor 33 and diode 32, thereby causing the positive going signal of FIG. 4c to travel through resistor 45 to the base of avalanche transistor 35. The wave of FIG. 4c begins sharply, for the specific circuit described in the foregoing, substantially 20 nanosecond after time $t_0$, which time corresponds to the time of the peak value of the short base-band pulse of FIG. 4a and then begins to experience decay.

The positive wave of FIG. 4c, on the order of +10 volts, at the base of avalanche transistor 35 causes the series diodes 43 and 44 to draw current heavily through resistor 45. The potential at terminal 50 of tunnel diode 25 abruptly changes, resetting tunnel diode 25 and reversing its state. After a time shown by FIG. 4e, it returns to its normal or quiescent state. Conduction through diode 32 fails, thus protecting the collector of transistor 33 from experiencing excessive positive bias.

The circuit continues to move toward its original quiescent state. Capacitor 41 discharges, mainly through the circuit path including resistor 34, resistor 40, and the avalanche transistor 35, at an exponential rate of decay in dependence upon the time constant of that discharge circuit. On the other hand, capacitor 41 recharges much more slowly through resistor 36.

Figure 4D:
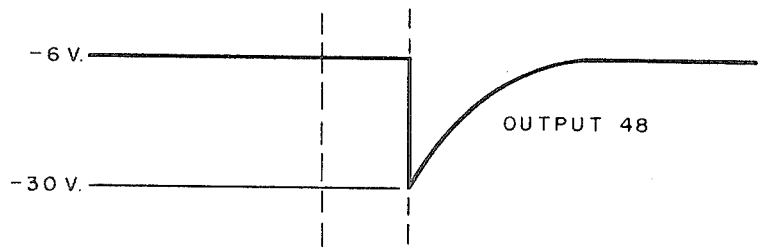
Figure 4E:
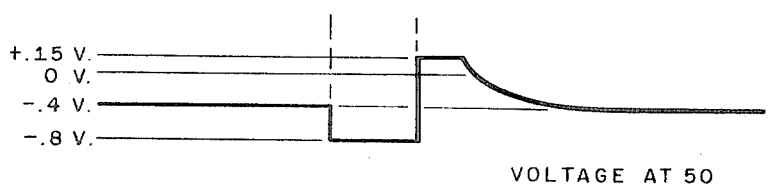

As previously noted, useful output signals comprising relatively long duration pulses appear on output leads 47 and 48; these have the general character shown in FIG. 4d and appear simultaneously. The pulse on lead 47 has a substantially −100 volt peak value from the −6 volt level and a 63 percent of peak amplitude duration $d$ of substantially 200 nanoseconds. The pulse appearing on lead 48 has a substantially 30 volt peak value from the −6 volt level and a 63 percent peak amplitude duration of substantially 200 nanoseconds. The delay e of the sharp rise of the output pulses is again substantially 20 nanoseconds behind the peak at $t_0$ of the received short-base pulse of FIG. 4a.

The output signals found on leads 47, 48 may be coupled to any desired utilization apparatus 51, 52 of the type which functions in a normal manner upon receipt of pulses of conventional or non-short-base-band duration and normally manipulated by ordinary pulse handling circuits. Although the actual utilization apparatus is not a necessary part of the present invention, it will be seen by those skilled in the art that it may take any of a variety of forms. For example, a single sub-nanosecond base-band pulse received by antenna 5 may be considered to be an intelligence transmission and the consequent output appearing on output leads 47 and 48 may be placed directly on a conventional cathode ray tube display 52 of the type, for instance, in which the sweep of the indicator along one coordinate is triggered by the pulse to be displayed, the pulse itself, after slight delay, being used to sweep the cathode ray beam along a second coordinate. Signal processor 51 and display 52 may alternatively, for example, count the number of sub-nanosecond pulses received by processor 55 in an arbitrary time period or in a particular pulse burst and then indicate the total count on a conventional numeric display 52. A train of sub-nanosecond pulses collected by antenna 5 may have a modulation, such as carried by pulse interval modulation, which is demodulated in a conventional way by processor 51 and either displayed on indicator 52 or, if the demodulated signal is an audio signal, used to operate a loud speaker or other audio instrument.

It is seen that the receiver of FIGS. 1, 2, and 3 is a wide band or wide open detector device, a receiver which will respond to any signal level in excess of the bias level which might be dictated by the characteristics of a particular tunnel diode 25. The amplitude of the received impulse at the receiving antenna 5 may be, for example, about 200 millivolts in a typical operating circumstance, a value several orders of magnitude greater than the signals present in an urban environment due to conventional radiation sources, such interfering signals normally being at a microvolt level. Accordingly, although the novel receiver of FIG. 3 essentially accepts all signals over a very wide pass band, it is substantially immune to interference from conventional radiation sources, including electrical noise signals such as internal combustion engine ignition noise.

The directive transmitter-antenna configuration 3, 4 shown in FIG. 1 may be, for instance, capable of transmitting a regular train or burst of extremely short duration, low or high amplitude impulses. In one typical situation, these impulse-like signals have time durations of substantially 200 pico-seconds and an impulse repetition frequency in the order of 10 kilohertz. However, the upper bound on the average power transmitted into all of space may be less than 1 microwatt. The spectrum of the transmitted signal is spread over an extremely wide band width, typically 100 megahertz to 10 gigahertz. Accordingly, the power radiated in any typical narrow communication band is far below the thermal noise threshold of a typical receiver operating in that band. The transmitted impulse is therefore incapable of interfering with the operation of standard radio communication equipment, while being remarkably adapted for use with the receiver of the present invention.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. A receiver for receiving short electromagnetic pulse signals comprising:

wide band transmission line antenna means for collecting and propagating an electromagnetic pulse signal in the TEM transmission mode, semiconductor diode means having first and second stable states in energy exchanging relation with said antenna means, first circuit means biasing said semiconductor diode means in said first state for permitting said semiconductor diode means substantially instantaneously to change from its said first to its said second state upon arrival at said semiconductor diode means of said electromagnetic pulse in substantially undistorted form, second circuit means coupled to said first circuit means for producing an output wave of amplified energy and of greater duration than said electromagnetic pulse, and third circuit means utilizing a version of said output wave for returning said semiconductor diode means to its said first state.

2. Apparatus as described in claim 1 wherein:
said first circuit means comprises bias voltage divider means in series relation with said semiconductor diode means,
said second circuit means comprises: transistor amplifier means, potential source means, and output means, and
said third circuit means comprises unilateral conductor means for coupling a version of said output wave to said voltage divider means.

3. Apparatus as described in claim 1 wherein said wide band transmission line antenna means comprises dual conductor transmission line means having a substantially constant characteristic impedance and a substantially dispersionless characteristic.

4. Apparatus as described in claim 3 wherein said dual conductor transmission line means comprises first and second planar conductor means having opposed major conducting surface means.

5. Apparatus as described in claim 4 wherein said planar conductor means are of truncated triangular shape.

6. Apparatus as described in claim 5 wherein TEM mode dual conductor means is coupled at said truncations to said planar conductor means in substantially impedance matched relation thereto.

7. Apparatus as described in claim 6 wherein said semi-conductor diode means is coupled in energy exchanging relation across said dual conductor means.

8. Apparatus as described in claim 1 wherein said semi-conductor diode means comprises tunnel diode means.

9. Apparatus as described in claim 8 wherein said first circuit means comprises in series relation:
bias source means,
first impedance means,
said tunnel diode means, and
second impedance means.

10. Apparatus as described in claim 9 wherein said second circuit means comprises:
third impedance means,
first diode means, and
first transistor means,
said bias source means, said third impedance means, said diode means, and said first transistor means being connected in series relation, and
fourth impedance means coupled between first impedance means and said tunnel diode means for forward biasing said first transistor means into conduction substantially when said tunnel diode means is transferred to its said second state.

11. Apparatus as described in claim 10 wherein said second circuit means comprises:
fifth impedance means,
second transistor means, and
potential source means,
said fifth impedance means, said second transistor means, and said potential source means being connected in series relation,
sixth impedance means coupled between said third impedance means and said first diode means for causing conduction of said second transistor means when said first transistor means is in its conductive state,
seventh and eighth impedance means coupled across said fifth impedance means and said second transistor means for providing said output wave across said eighth impedance means, 12. Apparatus as described in claim 11 wherein said third circuit means comprises:
second diode means connected between said first diode means and said third impedance means and connected between said first impedance means and said tunnel diode means, and
third diode means connected between said first impedance means and said tunnel diode means and connected to said potential source means,
said first and said second diode means being poled for causing return of said tunnel diode means to its said first state upon conduction of said second transistor means.

* * * * *